(12) United States Patent
Velummylum et al.

(10) Patent No.: US 11,481,302 B2
(45) Date of Patent: *Oct. 25, 2022

(54) PROCESSING DATA OBJECT MODIFICATIONS IN A NETWORKED STORAGE SYSTEM

(71) Applicant: Amazon Technologies, Inc., Reno, NV (US)

(72) Inventors: Piragash Velummylum, Seattle, WA (US); Johanna S. Olson, Bellevue, WA (US); Korwin J. Smith, Seattle, WA (US); James H. Wood, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 11 days.

This patent is subject to a terminal disclaimer.

(21) Appl. No.: 17/228,257

(22) Filed: Apr. 12, 2021

(65) Prior Publication Data

US 2021/0232476 A1 Jul. 29, 2021

Related U.S. Application Data

(63) Continuation of application No. 16/521,085, filed on Jul. 24, 2019, now Pat. No. 10,977,148, which is a
(Continued)

(51) Int. Cl.
*G06F 11/30* (2006.01)
*G06F 9/445* (2018.01)
(Continued)

(52) U.S. Cl.
CPC ...... *G06F 11/3086* (2013.01); *G06F 9/44505* (2013.01); *G06F 16/10* (2019.01); *G06F 16/1734* (2019.01); *G06F 16/78* (2019.01)

(58) Field of Classification Search
None
See application file for complete search history.

(56) References Cited

U.S. PATENT DOCUMENTS

| 5,684,991 | A | 11/1997 | Malcolm |
| 5,696,975 | A | 12/1997 | Moore et al. |
| (Continued) | | | |

FOREIGN PATENT DOCUMENTS

CA   2562660 A1   4/2007

OTHER PUBLICATIONS

U.S. Appl. No. 13/036,539 entitled "Metadata-Based File System," which was filed on Feb. 28, 2011. (**Copy not provided.).

(Continued)

*Primary Examiner* — Jeffrey R Swearingen
(74) *Attorney, Agent, or Firm* — Thomas Horstemeyer, LLP

(57) ABSTRACT

Disclosed are various embodiments for triggering a processing of a data object stored in a bucket in a data store. In one embodiment, a cloud computing resource comprising one or more processors in communication with a data store receives a notification event generated in response to a modification of a data object in one or more buckets. The cloud computing resource determines, responsive to the received notification event, that a data object stored in a bucket in the data store has been modified. The cloud computing resource triggers a processing of the data object by executable code associated with the data object. The executable code causes a notification message, processing of the modified data object, or other user specified processes within a platform as a service cloud computing offering.

20 Claims, 4 Drawing Sheets

Related U.S. Application Data continuation of application No. 16/114,515, filed on Aug. 28, 2018, now Pat. No. 10,402,297, which is a continuation of application No. 15/601,184, filed on May 22, 2017, now Pat. No. 10,067,846, which is a continuation of application No. 13/161,179, filed on Jun. 15, 2011, now Pat. No. 9,658,935.

(51) Int. Cl.
*G06F 16/78* (2019.01)
*G06F 16/17* (2019.01)
*G06F 16/10* (2019.01)

(56) References Cited

U.S. PATENT DOCUMENTS

| | | | |
|---|---|---|---|
| 5,732,266 A | 3/1998 | Moore et al. | |
| 5,745,903 A | 4/1998 | Huan | |
| 5,835,759 A | 11/1998 | Moore et al. | |
| 5,889,954 A | 3/1999 | Gessel et al. | |
| 5,941,995 A | 8/1999 | Morrison | |
| 6,026,440 A | 2/2000 | Shrader et al. | |
| 8,924,500 B2 | 12/2014 | Velummylum et al. | |
| 2005/0108206 A1 | 5/2005 | Lam et al. | |
| 2005/0165597 A1 | 7/2005 | Nightingale | |
| 2009/0113076 A1 | 4/2009 | Long | |
| 2011/0099146 A1* | 4/2011 | McAlister | G06F 11/2076 |
| | | | 707/634 |
| 2011/0252071 A1 | 10/2011 | Cidon | |
| 2012/0023077 A1* | 1/2012 | Kann | G06F 16/275 |
| | | | 707/E17.005 |

OTHER PUBLICATIONS

U.S. Appl. No. 13/074,325 entitled "Local Storage Linked to Networked Storage System," which was filed on Mar. 29, 2011. (**Copy not provided.).

* cited by examiner

PROCESSING DATA OBJECT MODIFICATIONS IN A NETWORKED STORAGE SYSTEM

CROSS-REFERENCE TO RELATED APPLICATIONS

This application is a continuation of, and claims priority to, co-pending U.S. patent application entitled "PROCESSING FILE MODIFICATIONS IN A NETWORKED STORAGE SYSTEM," filed Jul. 24, 2019, and assigned application Ser. No. 16/521,085, which is a continuation of, and claims priority to, U.S. patent application entitled "PROCESSING FILE MODIFICATIONS IN A NETWORKED STORAGE SYSTEM," filed Aug. 28, 2018, assigned application Ser. No. 16/114,515, issued on Sep. 3, 2019, and assigned U.S. Pat. No. 10,402,297, which is a continuation of, and claims priority to, U.S. patent application entitled "PROCESSING FILE MODIFICATIONS IN A NETWORKED STORAGE SYSTEM," filed on May 22, 2017, assigned application Ser. No. 15/601,184, issued on Sep. 4, 2018, and assigned U.S. Pat. No. 10,067,846, which is a continuation of, and claims priority to, U.S. patent application entitled "PROCESSING FILE MODIFICATIONS IN A NETWORKED STORAGE SYSTEM," filed on Jun. 15, 2011, assigned application Ser. No. 13/161,179, issued on May 23, 2017, and assigned U.S. Pat. No. 9,658,935, each of which are incorporated herein by reference in their entireties.

BACKGROUND

Software as a service (SaaS) is a software-delivery model where applications and data are centrally hosted. Users of SaaS systems typically access the applications using a browser or another type of thin client. Similarly, platform as a service (PaaS) refers to the delivery of a computing platform or solution stack as a centrally hosted service. Configuration parameters for SaaS and PaaS systems may be updated through a network page interface, a command-line interface, or an application programming interface (API).

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Various embodiments of the present disclosure relate to remote storage of data files according to a utility computing model. A networked file system may be employed to provide access to files stored in a cloud computing resource comprising a networked plurality of computing devices. In some embodiments, the networked file system may correspond to a virtual file system where the actual data objects of the files are stored in a separate data storage system. A metadata service may be used to associate metadata with the files, thereby facilitating searches of the files using the metadata. By storing files in such a networked file system, users may access the files from any computing device that has network connectivity.

According to various embodiments, notifications of modifications to files may be sent to listeners associated with services, applications, systems, etc. In this way, the services, applications, systems, etc. are informed when users make changes to certain files of the networked file system. As a non-limiting example, users of the networked file system may also be users of various services, such as software as a service (SaaS), platform as a service (PaaS), etc. Such services may employ a file-based configuration system in conjunction with the networked file system. When a configuration file is stored in the networked file system, the user may edit the file as if it were a local file resident on the client of the user. The update to the file is propagated to the networked file system, which then sends a notification of the change to the service that is being configured. The service may then read the file, execute the configuration change, and/or perform other functionality in response to the file modification. In this way, the user may avoid using a browser-based configuration interface, a command-line interface, an application programming interface (API), or other unwieldy types of interfaces to update the service configuration. In the following discussion, first a description of the physical nature of the various components is provided, followed by a discussion of the operation of the same.

Figure 1:
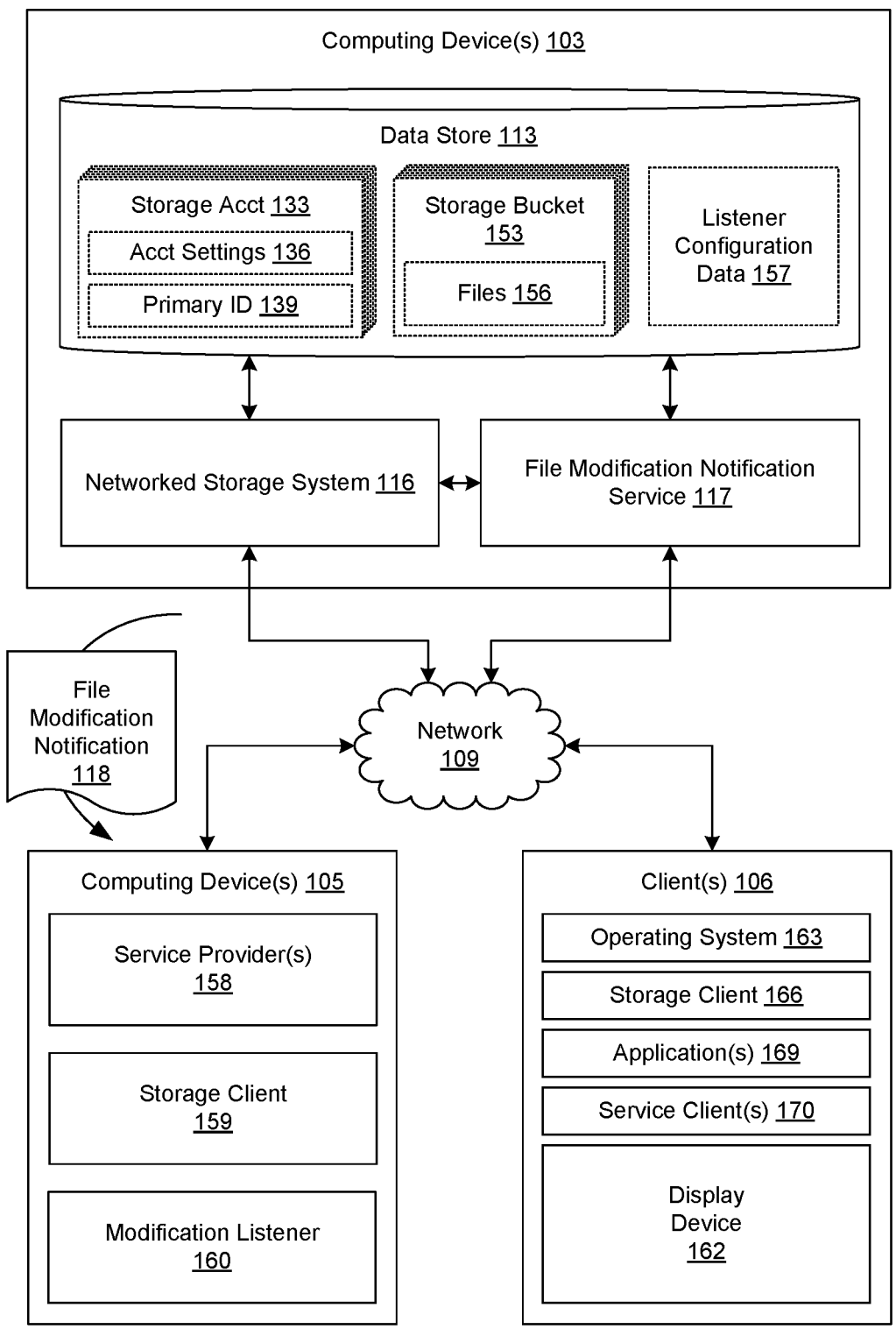
FIG. 1 is a drawing of a networked environment according to various embodiments of the present disclosure.

With reference to FIG. 1, shown is a networked environment 100 according to various embodiments. The networked environment 100 includes one or more computing devices 103, one or more computing devices 105, and one or more clients 106 in data communication by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 113 that is accessible to the computing device 103. The data store 113 may be representative of a plurality of data stores 113 as can be appreciated. The data stored in the data store 113, for example, is associated with the operation of the various applications and/or functional entities described below.

The components executed on the computing device 103, for example, include a networked storage system 116, a file modification notification service 117, and other applications, services, processes, systems, engines, or functionality not discussed in detail herein. The networked storage system 116 is executed to maintain a file hierarchy of files and folders in networked or metadata-based file systems for users. To this end, the networked storage system 116 may support various file-related operations such as, for example, creating files, deleting files, modifying files, setting permissions for files, downloading files, and/or other operations. The networked storage system 116 may be configured to serve up data addressed by uniform resource locator (URL) via hypertext transfer protocol (HTTP). In one embodiment, the networked storage system 116 may be operated under a utility computing model. For example, each user may be assessed a fee for a certain quota of storage with the networked storage system 116.

A metadata service may be executed in association with or as part of the networked storage system 116 to maintain metadata items in association with files. To this end, such a metadata service may support various operations such as, for example, creating metadata items, deleting metadata items, retrieving metadata items, searching on metadata items, and/or other operations. The metadata service may also implement one or more searchable indices of the metadata items. It is noted that the networked file system associated with each user storage account in the networked storage system 116 may be a metadata-based file system such as that described by U.S. patent application Ser. No. 13/036,539 entitled "METADATA-BASED FILE SYSTEM," which was filed on Feb. 28, 2011 and is incorporated herein by reference in its entirety. In a metadata-based file system, the metadata for a file may be organized separately from the data for the file. For example, the metadata and the data may be stored within distinct data stores or computing devices.

Various applications may be provided that correspond to hosted applications that may access the data stored in the networked file system. Such applications may, for example, have a web-based interface and may serve up network pages, such as web pages or other forms of network content, to facilitate user interaction. Other applications may be internal applications and may not have a web-based interface. Non-limiting examples of such applications may include a photo organizing tool, a music file organizer and playback tool, a word processor, a spreadsheet, an email application, and so on.

The file modification notification service 117 is executed to send file modification notifications 118 regarding changes to files in the networked storage system 116 to one or more listening services. Such services may be executed in the computing device 103 or on other devices in data communication with the computing device 103 by way of the network 109. As a non-limiting example, when a user updates a configuration file stored by the networked storage system 116, a file modification notification 118 is generated by the file modification notification service 117 and sent to the service that is configured by the configuration file.

The data stored in the data store 113 includes, for example, storage accounts 133. Associated with each storage account 133 are account settings 136, a primary identifier 139, and potentially other information. The primary identifier 139 may comprise, for example, an email address, a string of characters, or other type of identifier as will be described. Associated with each storage account 133 are one or more storage buckets 153 in which various files 156 are stored on the behalf of the user who holds the storage account 133 as will be described.

The storage account 133 may include information about a user with which the storage account 133 is associated. Such information may comprise, for example, name, address, payment instruments, and other information. The account settings 136 may be employed to specify and track various settings and other functionality with respect to a given storage account 133 such as passwords, security credentials, file management permissions, storage quotas and limitations, authorized access applications, billing information, and/or other data. The account settings 136 may include third-party access permissions, e.g., permissions for services to access configuration files of a user that are stored by the networked storage system. The primary identifier 139 is an identifier associated with the holder of the respective storage account 133. Such a user may be deemed the primary holder of the account and can control its usage.

The data store 113 may also include listener configuration data 157 that configures the file modification notification service 117 to send file modification notifications 118 to one or more listening services. The listener configuration data 157 may specify certain filenames, file extensions, file paths, partial file paths, etc. for which file modification notifications 118 are to be sent. Further, the listener configuration data 157 may specify URLs or other interfaces by which the file modification notifications 118 are to be communicated to the listening services.

The computing device 105 may comprise, for example, a server computer or any other system providing computing capability. Alternatively, a plurality of computing devices 105 may be employed that are arranged, for example, in one or more server banks or computer banks or other arrangements. For example, a plurality of computing devices 105 together may comprise a cloud computing resource, a grid computing resource, and/or any other distributed computing arrangement. Such computing devices 105 may be located in a single installation or may be distributed among many different geographical locations. For purposes of convenience, the computing device 105 is referred to herein in the singular. Even though the computing device 105 is referred to in the singular, it is understood that a plurality of computing devices 105 may be employed in the various arrangements as described above.

Various applications and/or other functionality may be executed in the computing device 105 according to various embodiments. Also, various data may be stored in a data store that is accessible to the computing device 105. The components executed on the computing device 105, for example, include one or more service providers 158, a storage client 159, a modification listener 160, and other applications, services, processes, systems, engines, or functionality not discussed in detail herein. The service provider 158 may correspond to an application associated with a SaaS system, a PaaS system, or any other application that may be configured to act upon files 156 edited by users. In various embodiments, the service provider 158 may generate and serve up network pages, such as web pages or other forms of network content, that are sent to the client 106.

A storage client 159 is provided for the service provider 158 to read and/or write data to the networked storage system 116 over the network 109. The storage client 159 may be granted access to various user files 156 stored in the network storage system 116 as configured by the user. The modification listener 160 is executed to obtain and process file modification notifications 118 sent by the file modification notification service 117. In response to the file modification notification 118, the modification listener 160 may be configured to obtain one or more files 156 from the networked storage system 116 and trigger processing of the file(s) 156 by the service provider 158 and/or other systems. In one embodiment, the modification listener 160 may be configured to send polling requests to the file modification notification service 117 to determine whether an update to a file 156 has occurred.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, electronic book readers, smart phones, or other devices with like capability. The client 106 may include a display device 162 such as a liquid crystal display (LCD), or other type of display device as can be appreciated.

The client 106 may be configured to execute an operating system 163, a storage client 166, applications 169 such as email applications, instant message applications, browsers, word processors, spreadsheets, drawing applications, and/or other applications, and one or more service clients 170. In one embodiment, the storage client 166 may correspond to client-side executable code provided in conjunction with a browser-based interface served up by the networked storage system 116. In another embodiment, the storage client 166 may correspond to code integrated with the operating system 163 to facilitate access to the networked storage system 116 through a file explorer or similar program. In yet another embodiment, the storage client 166 may correspond to a standalone program for managing the files 156 of the user in the networked storage system 116.

The service client 170 may correspond to a browser or another type of thin client that may provide a user interface for one or more service providers 158. As a non-limiting example, a service provider 158 may correspond to an office productivity suite offered as SaaS, which may include applications such as, for example, a word processor, spreadsheet, database, presentation manager, etc. To this end, the service provider 178 may generate one or more network pages as user interfaces, which are sent to the service client 170 and rendered for display by the display device 162.

Next, a general description of the operation of the various components of the networked environment 100 is provided. To begin, a user may configure a storage account 133 on the computing device 103. One or more storage buckets 153 may be assigned to the user with the primary identifier 139 of the user. Once a storage account 133 is configured, the user may begin storing files 156 on the networked storage system 116.

In one example, the user may upload a file 156 to the networked storage system 116 over the network 109 by way of a browser-based interface. In another example, the storage client 166 executed in the client 106 may be configured to make the networked storage system 116 appear to be a local storage device. In such an example, the user may simply store a file 156 on the networked storage system 116 as if it were any local storage device, and the storage client 166 handles the uploading in the background. In yet another example, the user may purchase a file 156 or otherwise generate a file 156 by way of an application executed in the computing device 103, and the application stores the file 156 in the storage bucket 153 for the user.

Once files 156 are available in the networked storage system 116, the user may begin reading the files and/or modifying metadata that describes the files. In one example, the user may access the networked storage system 116 through a browser-based interface and download or modify files 156 through such an interface. In another example, the user may access the networked storage system 116 through the storage client 166 as if it were any locally accessible storage device. For instance, the operating system 163 may be configured to present the networked storage system 116 as if it were a mounted drive or file system in the client 106. The files 156 may be downloaded, organized by the user into directories, renamed, modified, and so on.

Because storage of the files 156 is maintained by the networked storage system 116, the files 156 may be associated with a service-level agreement of the operator of the computing device 103. Such a service-level agreement may comprise, for example, reliability, availability, and/or other guarantees. Further, the files 156 may be accessed by diverse clients 106 of the user which may be on different portions of the network 109. For example, the clients 106 of the user may comprise a desktop computer connected to the network 109 through a home broadband connection, a laptop computer connected to the network 109 through a shared Wi-Fi connection at a public location, a smart phone connected to the network 109 through a cellular data network, and so on.

The performance of the networked storage system 116 may be enhanced through the use of a device that offers network-attached storage to clients 106 connected through a local network. Such a network-attached storage system may support faster access by the client 106 than the networked storage system 116. In addition, such a network attached storage system may support more storage for the user than the networked storage system 116. The networked storage system 116 may also be supplemented by local storage of cached data in the client 106 in some embodiments. Various techniques relating to the use of local storage on the client 106 are described in U.S. patent application Ser. No. 13/074,325 entitled "LOCAL STORAGE LINKED TO NETWORKED STORAGE SYSTEM," which was filed on Mar. 29, 2011 and is incorporated herein by reference in its entirety.

The user may specify various configuration parameters in the listener configuration data 157 for service providers 158 that are to have access to file modification notifications 118 regarding certain files 156 stored in the networked storage system 116. As a non-limiting example, the user may specify that all changes to any file 156 having a filename ending with ".config" are to be forwarded as file modification notifications 118 to a particular service provider 158. As another non-limiting example, the user may specify that the creation of any new file 156 or changes to any existing file 156 within the directory "/database_manager/etc" are to be forwarded as file modification notifications 118 to a service provider 158 corresponding to a "Database Manager" application offered as SaaS.

The various types of file modification notifications 118 that are to be forwarded to a service provider 158 may also be specified in the listener configuration data 157. Creation of new files 156, modification of existing files 156, deletion of existing files 156, and/or other events may trigger different file modification notifications 118 that may or may not be forwarded to the modification listeners 160 of the respective service providers 158 based at least in part on configuration settings in the listener configuration data 157. As a non-limiting example, a user may configure the creation of any file 156 named "core" to trigger a file modification notification 118 to be sent to a modification listener 160 associated with a software debugging service. As another non-limiting example, a user may configure the modification of a file 156 named "photo-editor.xml" to trigger a file modification notification 118 to be sent to a modification listener 160 associated with a photo editor service.

In addition to specifying notification settings, the user may establish access parameters for the service providers 158 in the account settings 136. For example, the user may establish usernames, passwords, keys, and/or other security credentials for the service providers 158 to use in obtaining files 156 of the user. The user may grant and/or deny access for a service provider 158 to various files 156 and/or file paths within the networked storage system 116. Once configuration settings in the data store 113 are properly configured, the modification listener(s) 160 corresponding to the various service providers 158 may register with the file modification notification service 117. Authentication may be performed using OAuth or other authentication libraries.

When the user initiates a change to a monitored file 156, or creates a file 156 that is monitored, the updated data is sent over the network 109 by the storage client 166 to the networked storage system 116. It is noted that it may appear to the user that the file 156 is local to the client 106, even though the file system to which the file 156 is saved is in fact maintained across the network 109, which may include the Internet. In one embodiment, the networked storage system 116 may be authoritative, and the change may not be regarded as finalized until acknowledged as committed by the networked storage system 116. In another embodiment, the storage client 166 or a caching device such as a network-attached storage device may be considered authoritative.

When the change to the file 156 is committed by the networked storage system 116, the file modification notification service 117 determines the modification listener(s) 160 that are associated with the file 156. Alternatively, the file modification notification service 117 may determine modification listener(s) 160 associated with the file 156 in response to obtaining a polling request from the modification listener(s) 160 over the network 109. In one embodiment, the modification listener(s) 160 are configured to send polling requests when their respective service providers 158 are prepared to process updates to the file 156. If there are modification listeners 160 associated with the file 156 that have permission to receive modification notifications, the file modification notification service 117 generates a file modification notification 118 and sends it across the network 109 to the appropriate modification listener(s) 160. The modification listeners 160 process the file modification notification 118 and may trigger the respective service providers 158 to obtain the modified files 156 from the networked storage system 116 using the storage client 159.

The file modification notification 118 may include a starting offset or other indicator of where in the file 156 a change has occurred. In one embodiment, if the change occurs near the end of the file 156, the service provider 158 and the storage client 159 may be configured to obtain only a portion of the file 156 that may be affected by the change. In an alternative embodiment, the file 156 or the changed portion of the file 156 may be sent within, or otherwise in association with, the file modification notification 118 so that the storage client 159 and the service provider 158 do not have to affirmatively request the file 156 or the changed portion thereof.

Once the service provider 158 obtains the updated file 156 from the networked storage system 116 by way of the network 109, the service provider 158 may initiate some processing based at least in part upon the file 156. For example, the service provider 158 may modify an entire SaaS stack based at least in part upon the file 156 being persisted in the networked storage system 116. The service provider 158 may reload one or more configuration parameters or take other actions based upon the changed contents of the file 156.

Depending on the configuration parameters of the networked storage system 116, write locks may be acquired by a client 106 to prevent other clients 106 from updating a file 156 at the same time. Alternatively, the networked storage system 116 may be configured to commit new versions of a file 156 in the order that they are received by the networked storage system 116. In one embodiment, the storage buckets 153 employed by the networked storage system 116 to store the files 156 may correspond to eventually consistent data storage, where a read operation following a write operation may not obtain the written data.

In such a system, the file modification notification service 117 may be configured not to generate a file modification notification 118 until the file 156 is consistent, in order to ensure that the storage client 159 and/or the modification listener 160 obtain the latest data. Alternatively, the written data may be intercepted prior to storage in the storage bucket 153 and sent as part of the file modification notification 118 or otherwise cached. Consequently, the eventual consistency of the storage bucket 153 does not affect what data is obtained by the storage client 159 and/or the modification listener.

Figure 2:
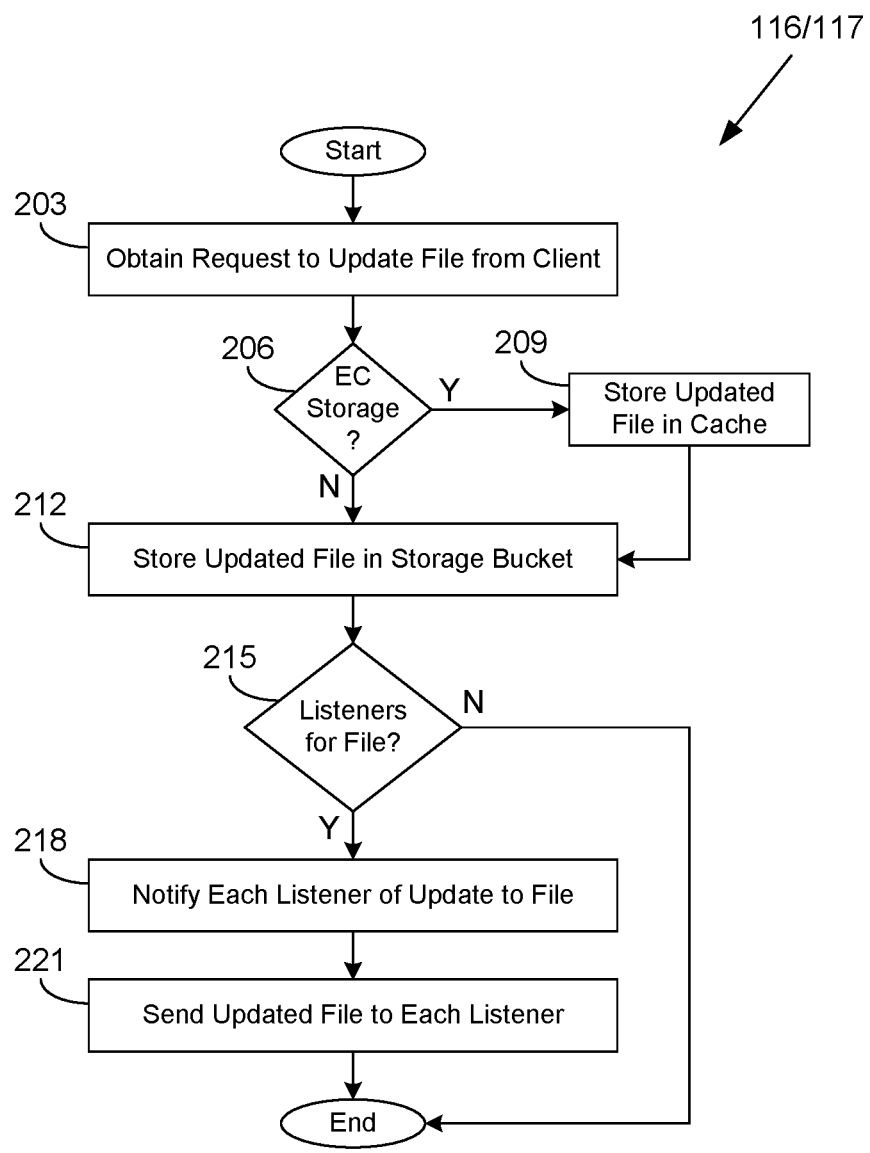
FIG. 2 is a flowchart illustrating one example of functionality implemented as portions of a networked storage system and a file modification notification service executed in a computing device in the networked environment of FIG. 1 according to various embodiments of the present disclosure.

Referring next to FIG. 2, shown is a flowchart that provides one example of the operation of portions of the networked storage system 116 and the file modification notification service 117 according to various embodiments. It is understood that the flowchart of FIG. 2 provides merely an example of the many different types of functional arrangements that may be employed to implement the operation of the portions of the networked storage system 116 and the file modification notification service 117 as described herein. As an alternative, the flowchart of FIG. 2 may be viewed as depicting an example of steps of a method implemented in the computing device 103 (FIG. 1) according to one or more embodiments.

Beginning with box 203, the networked storage system 116 obtains a request to update a file 156 (FIG. 1) from a storage client 166 (FIG. 1) executed in a client 106 (FIG. 1). In box 206, the networked storage system 116 determines whether the storage bucket 153 (FIG. 1) corresponding to the file 156 is stored using eventually consistent storage. If the storage bucket 153 is stored using eventually consistent storage, the networked storage system 116 stores the updated file 156 in a cache. The networked storage system 116 continues to box 212. If the storage bucket 153 is not stored using eventually consistent storage (e.g., if the storage bucket 153 is stored using consistent storage), the networked storage system 116 proceeds from box 206 to box 212.

In box 212, the networked storage system 116 stores the updated file 156 in the corresponding storage bucket 153. In box 215, the file modification notification service 117 determines whether there are any modification listeners 160 (FIG. 1) associated with the file 156. In various embodiments, metadata that is associated with the file 156 may indicate an association with one or more modification listeners 160. For example, the file name, file extension, or file path of the file 156 may be mapped to one or more modification listeners 160. The mapping may be performed on a partial match, e.g., using wildcards, etc.

If one or more modification listeners 160 are associated with the file 156, the file modification notification service 117 moves to box 218 and notifies each of the modification listeners 160 of the update to the file 156 by sending a file modification notification 118 (FIG. 1) over the network 109 (FIG. 1) to the respective computing device 105 (FIG. 1). In box 221, the networked storage system 116 sends the updated file 156 to each of the modification listeners 160 or their associated applications 169 (FIG. 1). If the update affects only portion(s) of the file 156, the affected portion(s) may be transmitted in place of the entire file 156 in some circumstances.

In one embodiment, the updated file 156 may be included within the file modification notification 118. In another embodiment, the application 169 and/or the modification listener 160 may be configured to request the updated file 156 from the networked storage system 116. After the updated file 156 is sent to each associated modification listener 160, the portions of the networked storage system 116 and the file modification notification service 117 end. If the file modification notification service 117 instead determines in box 215 that there are no associated modification listeners 160 for the file 156, the portions of the networked storage system 116 and the file modification notification service 117 also end.

Figure 3:
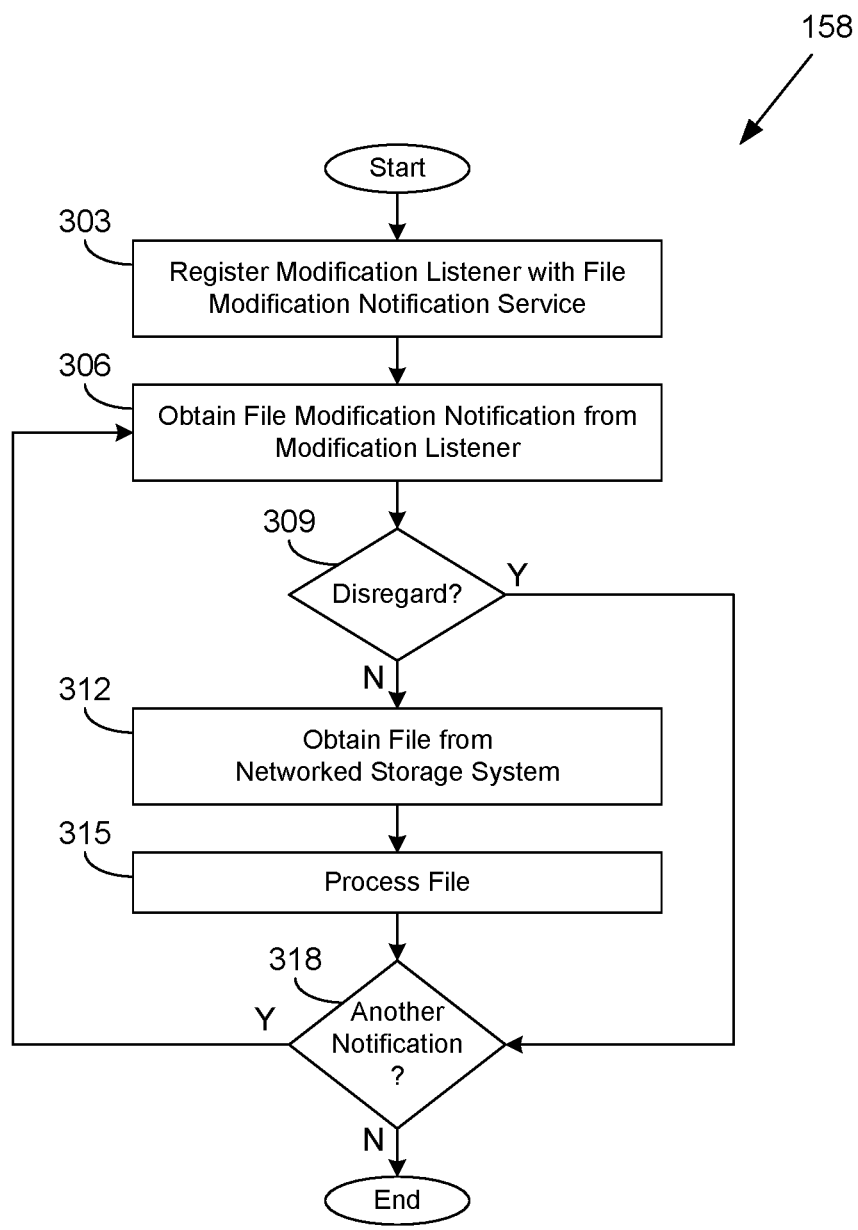
FIG. 3 is a flowchart illustrating one example of functionality implemented as portions of a service provider executed in a computing device in the networked environment of FIG. 1 according to various embodiments of the present disclosure.

Turning now to FIG. 3, shown is a flowchart that provides one example of the operation of a portion of the service provider 158 according to various embodiments. It is understood that the flowchart of FIG. 3 provides merely an example of the many different types of functional arrangements that may be employed to implement the operation of the portion of the service provider 158 as described herein. As an alternative, the flowchart of FIG. 3 may be viewed as depicting an example of steps of a method implemented in the computing device 105 (FIG. 1) according to one or more embodiments.

Beginning with box 303, the service provider 158 registers one or more modification listeners 160 (FIG. 1) with the file modification notification service 117 (FIG. 1), which associates one or more files 156 (FIG. 1) with the modification listeners 160. In box 306, the service provider 158 obtains a file modification notification 118 (FIG. 1) from the modification listener 160. In box 309, the service provider 158 determines whether the file modification notification 118 is to be disregarded. As a non-limiting example, the modification may concern a file 156 that is not currently in use by the service provider 158, which may allow updates to the file 156 to be disregarded by the service provider 158.

If the service provider 158 determines that the file modification notification 118 is not to be disregarded, the service provider 158 moves to box 312 and obtains the file 156 from the networked storage system 116 (FIG. 1). In one embodiment, the file 156 or portions thereof may be contained within the file modification notification 118. In box 315, the service provider 158 may process the file 156. For example, the service provider 158 may update a configuration based at least in part on changed contents of the file 156. The service provider 158 proceeds to box 318. If the service provider 158 instead determines in box 309 that the file modification notification 118 may be disregarded, the service provider 158 also moves to box 318.

In box 318, the service provider 158 determines whether another file modification notification 118 is to be obtained. If another file modification notification 118 is to be obtained, the service provider 158 returns to box 306 and obtains the next file modification notification 118. Otherwise, the portion of the service provider 158 ends.

Figure 4:
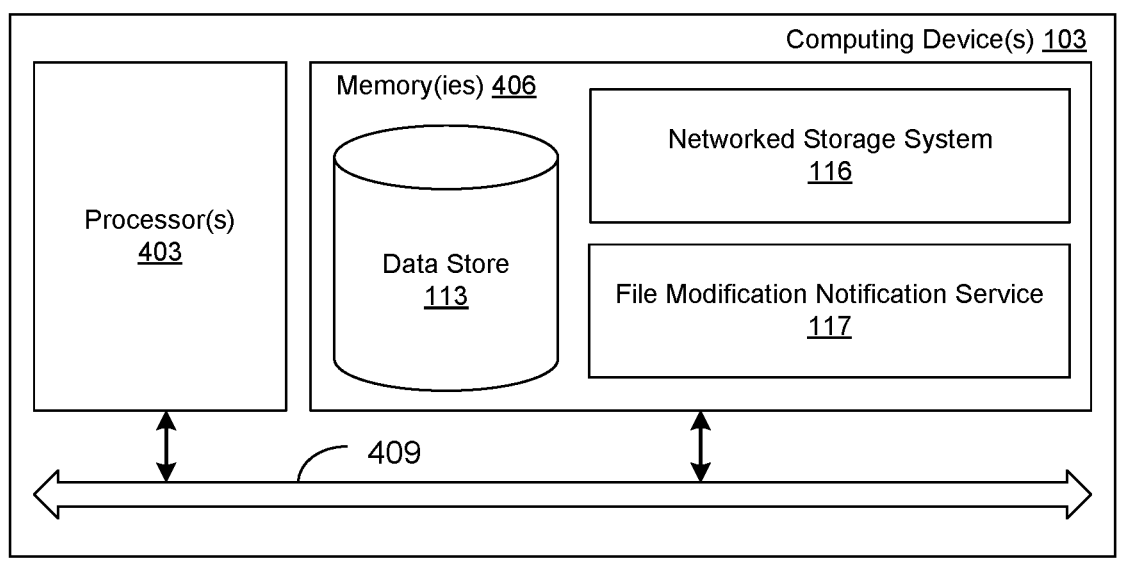
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the networked storage system 116, the file modification notification service 117, and potentially other applications. Also stored in the memory 406 may be a data store 113 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Delphi®, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the networked storage system 116, the file modification notification service 117, the storage client 166 (FIG. 1), storage client 159 (FIG. 1), the service provider 158 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the networked storage system 116, the file modification notification service 117, and the service provider 158. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the networked storage system 116, the file modification notification service 117, the storage client 166, storage client 159, and the service provider 158, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system providing a platform as a service cloud computing offering, comprising:
   a data store operated under a utility computer model using a network storage system, wherein user data objects are stored in one or more buckets associated with a user storage account;
   a browser-based configuration interface, a command-line interface, or an application programming interface through which a user can specify notification events and modifications to data objects stored in one or more buckets that will trigger such notification events; and
   a cloud computing resource comprising one or more processors in communication with the data store, the processor(s) configured to at least:
   receive a notification event generated in response to a modification of a data object in one or more buckets;

determine, responsive to the received notification event, that a data object stored in a bucket in the data store has been modified; and trigger a processing of the data object by executable code associated with the data object, wherein the executable code causes a notification message, processing of the modified data object, or other user specified processes within the platform as a service cloud computing offering.

2. The system of claim 1, wherein the data store is configured to be addressed by a locator.

3. The system of claim 1, wherein the processor(s) are further configured to trigger a different processing associated with the data object.

4. The system of claim 3, wherein the different processing is further associated with at least one of: a function, a service, an application, or a system.

5. The system of claim 3, wherein the processor is further configured to identify, based at least in part on configuration data, an interface by which the different processing is to be triggered.

6. The system of claim 5, wherein the configuration data indicates an association between the data object and the executable code.

7. The system of claim 1, wherein determining that the data object has been modified further comprises determining that the data object has been updated, deleted, or moved.

8. A computer-implemented method, comprising:
receiving, by a cloud computing resource comprising one or more processors in communication with a data store, a notification event generated in response to a modification of a data object in one or more buckets;
determining, by the cloud computing resource and responsive to the received notification event, that a data object stored in a bucket in the data store has been modified; and
triggering, by the cloud computing resource, a processing of the data object by executable code associated with the data object, wherein the executable code causes a notification message, processing of the modified data object, or other user specified processes within a platform as a service cloud computing offering.

9. The computer-implemented method of claim 8, wherein the data store is operated under a utility computing model using a network storage system.

10. The computer-implemented method of claim 8, wherein user data objects are stored in one or more buckets associated with a user storage account.

11. The computer-implemented method of claim 8, further comprising receiving, by at least one of a browser-based configuration interface, a command-line interface, or an application programming interface, user-specified notification events and modifications to data objects stored in one or more buckets that will trigger such notification events.

12. The computer-implemented method of claim 8, wherein determining that the data object has been modified comprises determining that the data object has been updated, deleted, or moved.

13. The computer-implemented method of claim 8, further comprising registering the executable code as associated with determining that the data object has been modified.

14. The computer-implemented method of claim 8, wherein the executable code is associated with a particular data object type of the data object.

15. The computer-implemented method of claim 9, further comprising triggering a subsequent processing by at least one of: a function, a service, an application, or a system associated with the data object.

16. A non-transitory computer-readable medium embodying instructions executable in a processor, wherein when executed the instructions cause the processor to at least:
receive a notification event generated in response to a modification of a data object in one or more buckets;
determine, responsive to the received notification event, that a data object stored in a bucket in a data store has been modified; and
trigger a processing of the data object by executable code associated with the data object, wherein the executable code causes a notification message, processing of the modified data object, or other user specified processes within a platform as a service cloud computing offering.

17. The non-transitory computer-readable medium of claim 16, wherein, when executed, the instructions further cause the processor to at least trigger, based at least in part on configuration data specifying an interface, a subsequent processing by different executable code associated with the data object.

18. The non-transitory computer-readable medium of claim 17, wherein the different executable code is further associated with at least one of: a function, a service, an application, or a system.

19. The non-transitory computer-readable medium of claim 16, wherein determining that the data object has been modified comprises determining that the data object has been updated, deleted, or moved.

20. The non-transitory computer-readable medium of claim 16, wherein the executable code corresponds to a particular data object type of the data object.

* * * * *